United States Patent
Ackermann

(10) Patent No.: US 7,554,728 B1
(45) Date of Patent: Jun. 30, 2009

(54) MODIFIED GREGORIAN ASTRONOMICAL TELESCOPE

(75) Inventor: Mark R. Ackermann, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 142 days.

(21) Appl. No.: 11/527,663

(22) Filed: Sep. 15, 2006

(51) Int. Cl.
G02B 23/06 (2006.01)

(52) U.S. Cl. ..................... 359/399; 359/365

(58) Field of Classification Search ........... 359/399, 359/423, 365
See application file for complete search history.

(56) References Cited

U.S. PATENT DOCUMENTS

| | | | | |
|---|---|---|---|---|
| 2,504,383 | A * | 4/1950 | Bouwers et al. | 359/366 |
| 4,836,666 | A * | 6/1989 | Meinel et al. | 359/365 |
| 5,089,910 | A * | 2/1992 | Sigler | 359/399 |
| 5,153,772 | A * | 10/1992 | Kathman et al. | 359/364 |
| 5,940,222 | A * | 8/1999 | Sinclair et al. | 359/689 |
| 7,236,297 | B1 * | 6/2007 | Ackermann et al. | 359/365 |

FOREIGN PATENT DOCUMENTS

JP 2000199860 A * 7/2000

OTHER PUBLICATIONS

Gontcharov, Alexander, "Survey of Possible Optical designs for an Extremely Large Telescope with a Spherical or an Aspherical Primary" technical report, Lund Telescope Group, Lund University [online], Jan. 1999 [retrieved on Jul. 2, 2008]. Retrieved from the Internet <URL: http://www.astro.lu.se/~torben/euro50/publications/index.html>.*

Ceravolo, Peter, "An All-Spherical Catadioptric Gregorian Design For Meter Class Telescopes." Ceravolo Optical Systems [online], Apr. 2005 [retrieved on Jul. 2, 2008]. Retrieved from the Internet <URL: http://www.ceravolo.com/design/cat_greg.htm>.*

* cited by examiner

*Primary Examiner*—Alessandro Amari
*Assistant Examiner*—Mark Consilvio
(74) *Attorney, Agent, or Firm*—AFMCLO/JAZ; Steve Sayeedi

(57) ABSTRACT

An optical system resembling a modified Gregorian astronomical telescope is disclosed in the specification and drawings. Lenses are used in the inter-focal region to modify the optical characteristics of the system. The use of such inter-focal lenses, can, for example, flatten the image plane of the field thereby increasing the field of view of the telescope.

2 Claims, 4 Drawing Sheets

IMA: 0.000 MM

IMA: --31.822 MM

IMA: -42.426 MM

IMA: -53.029 MM

IMA: -69.928 MM

IMA: -79.523 MM

OBJ: 0.0000 DEG

IMA: 0.000 MM

OBJ: 0.0100 DEG

IMA: -9.477 MM

OBJ: 0.0200 DEG

IMA: -18.894 MM

OBJ: 0.0300 DEG

IMA: -28.341 MM

OBJ: 0.0400 DEG

IMA: -37.789 MM

OBJ: 0.0500 DEG

IMA: -47.236 MM

MODIFIED GREGORIAN ASTRONOMICAL TELESCOPE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to the field of telescopes.

2. Description of the Related Art

The Gregorian telescope includes a parabolic primary mirror, which reflects incoming light rays through a focal point to an elliptical secondary mirror, which then refocuses the light to the final focal plane. These telescopes are expensive to construct because of the geometries required of the primary and secondary mirrors. In addition, these telescopes have a narrow field of view due to the curved focal surface, limiting the operation to fields on the order of about five minutes of arc.

There is a need in the art to increase the field of view. In addition, because of the high cost of constructing the telescope due to the large primary and secondary mirrors being aspheric (more difficult to manufacture conic sections), there is a need in the art to utilize aspheric primary and secondary mirrors.

BRIEF DESCRIPTION OF THE DRAWINGS

While the specification concludes with claims particularly pointing out and distinctly claiming that which is regarded as the present invention, the features, objects, and advantages of embodiments of the present invention can be more readily ascertained with reference to the following description, in conjunction with the accompanying drawings, in which:

DETAILED DESCRIPTION

Figure 1:
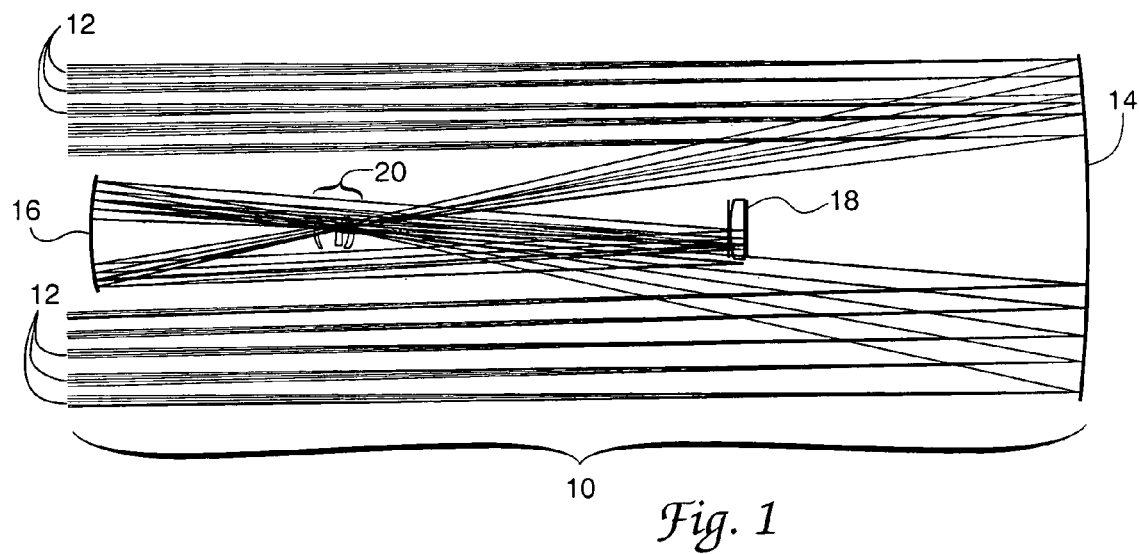
FIG. 1 is a simplified sectional view of one embodiment of the invention.

Referring to the drawings, FIG. 1 depicts a modified Gregorian telescope 10 according to one embodiment. Light or other electromagnetic radiation rays 12 entering the telescope are directed to a primary mirror 14, which reflects the light through an internal focus to a secondary mirror 16, which then reflects the light to an image point and, in this embodiment, through a lens 18 positioned just before (adjacent to) the focal plane.

Figure 2:
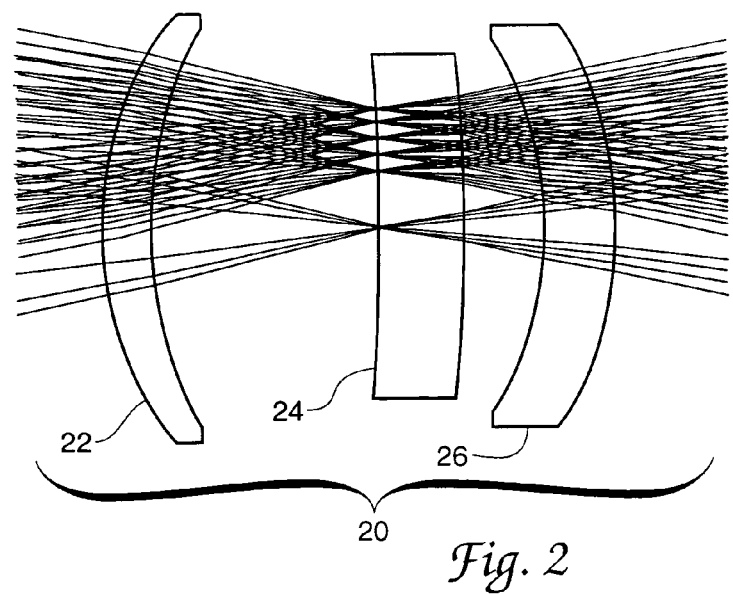
FIG. 2 is an enlarged view of the inter-focal region of FIG. 1.

This particular embodiment includes three lenses in the inter-focal region 20, shown in detail in FIG. 2. This inter-focal region 20, located between the primary mirror 14 and the secondary mirror 16, encompasses the focal point of the primary mirror 14 and the surrounding areas before and after the focal point of the primary mirror 14. Referring to FIG. 2, the inter-focal region 20 is shown with three spherical lenses 22, 24 and 26. In the illustrated embodiment, the surface of lens 24 is positioned at the primary focus.

In this embodiment, the primary mirror 14, secondary mirror 16 and inter focal lenses 22, 24 and 26 are positioned along the same axis. However, any suitable arrangement of mirrors and lenses may be configured in alternative embodiments of the invention.

Various combinations of lenses may be selected for the inter-focal region 20, positioned before, at and after the primary focus. By utilizing an appropriate selection and placement of these inter-focal lenses, a Gregorian-type telescope capable of imaging a field the width of a few minutes of arc can be expanded by a factor of 10 to 20, thereby allowing the imaging of fields of view in excess of 1.5 degrees across. This represents an imaging area performance gain of factors ranging from 100 to 400 better than previous Gregorian-type designs.

Use of these inter-focal lenses allows flexibility in specifying the shape of the primary mirror 14 and secondary mirror 16. These lenses may act as partial null lenses to compensate for the inherent aberrations of the primary and secondary mirrors and, if properly designed, are achromatic and may also compensate for the chromatic aberration of field flattening lenses near the focal plane.

The inter-focal lenses may be sized and positioned as desired. For example, the inter-focal lenses may be sized and positioned such that the light reflected from the primary mirror will pass through the inter-focal lenses and then, after reflecting off the secondary mirror, will pass back through these inter-focal lenses. Alternatively, the inter-focal lenses may be sized and positioned such that only the light reflecting off the primary mirror will pass through these lenses and light reflected off the secondary mirror will not pass through them but will instead be reflected directly to the focal plane.

Functional designs have been developed utilizing elliptical, parabolic and spherical secondary mirrors. In one embodiment, four inter-focal lenses—in which only one is aspherical—is used with a spherical secondary mirror. In this example, the telescope may be constructed less expensively as the cost of producing a parabolic or elliptical secondary mirror is higher than a smaller parabolic or elliptical inter-focal lens.

Figure 3:
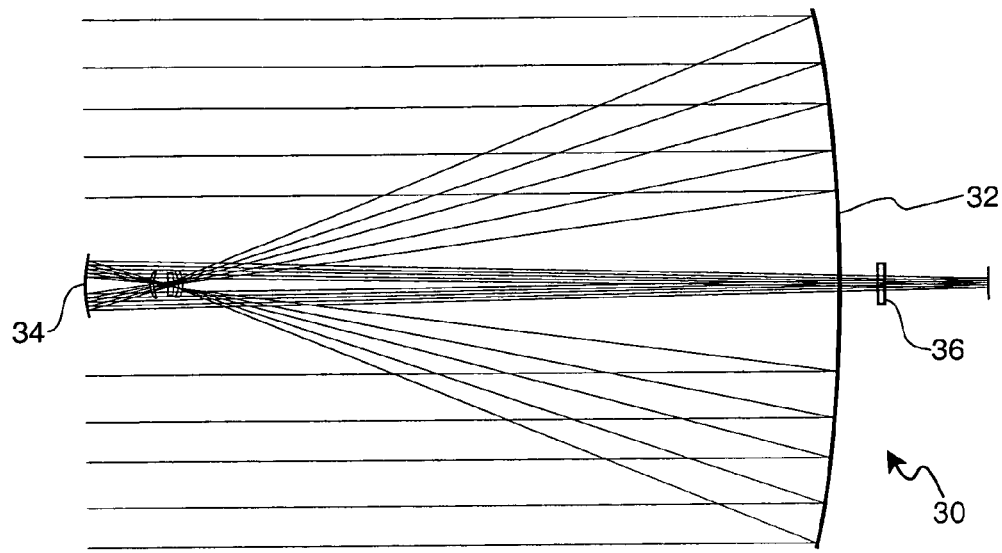
FIG. 3 is a simplified sectional view of an alternative embodiment of the invention.
Figure 4:
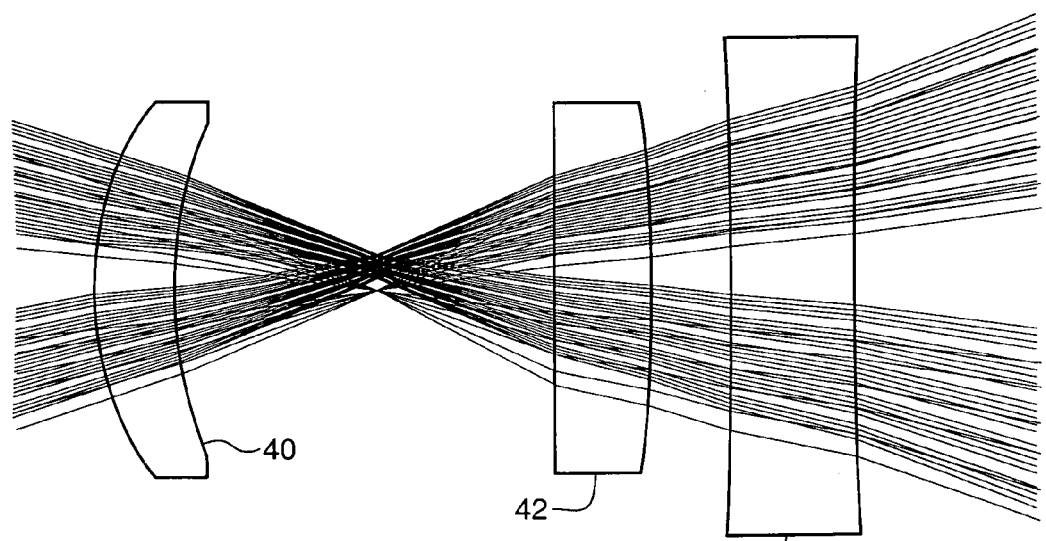
FIG. 4 is an enlarged view of the inter-focal region of FIG. 3.
Figure 5A:
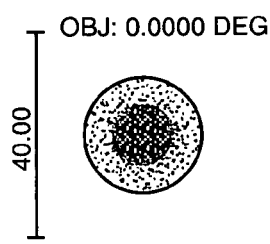
FIG. 5 is a ray-traced spot diagram of the embodiment shown in FIG. 3.
Figure 5B:
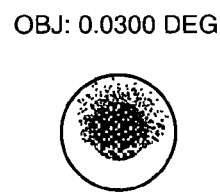
Figure 5C:
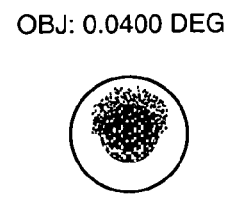
Figure 5D:
Figure 5E:
Figure 5F:

FIG. 3 shows the layout of one embodiment of a four-meter telescope 30 having a parabolic primary mirror 32, an elliptical secondary mirror 34, and a field flattening lens 36. This embodiment, as shown in FIG. 4, utilizes three inter-focal lenses 40, 42 and 44. This embodiment may be used to produce diffraction limited images over a $\frac{1}{4}^{th}$ degree circular field of view. Referring to FIG. 5, ray-traced spot diagrams show the performance of this design. The circles represent the diffraction limit while the dots represent the performance at individual wavelengths. The design was optimized for light in the wavelengths of 400-1,100 nanometers (nm).

The optical prescription for this embodiment is presented in the table below. The nomenclature used is from the ZEMAX® commercial optical design package. All dimensions are in millimeters (mm). In this embodiment, as shown in the table, fused silica was used for the inter-focal lenses. However, any material or materials having the desired optical properties may be used.

embodiment, a larger aspheric mirror is traded for a much smaller aspheric lens in the inter-focal region. Referring to FIG. 8, ray-traced spot diagrams show the performance of this design. The circles represent the diffraction limit while the dots represent the performance at individual wavelengths. The design was optimized for light in the wavelengths of 400-1,100 nanometers (nm).

TABLE 1

Optical Prescription for Telescope 30.

| No. | Comment | Radius of Curvature | Thickness | Glass | Semi Diameter | Conic |
|---|---|---|---|---|---|---|
| 0 | | Infinity | 0.0000 | | 0.000 | 0.00000 |
| 1 | | Infinity | 10.0000 | | 0.000 | 0.00000 |
| 2 | | Infinity | 5564.8210 | | 0.000 | 0.00000 |
| 3 | Primary (32) | −10000.0000 | −4921.7957 | Mirror | 2000.262 | −1.00000 |
| 4 | Lens 1 (40) | 2096.7496 | −24.4257 | Fused Silica | 49.989 | 0.00000 |
| 5 | | −1662.8108 | −14.7492 | | 43.377 | 0.00000 |
| 6 | Lens 2 (42) | −296.8339 | −18.6272 | Fused Silica | 37.254 | 0.00000 |
| 7 | | −1161.2286 | −17.3780 | | 32.169 | 0.00000 |
| 8 | | Infinity | −56.7209 | | 0.000 | 0.00000 |
| 9 | Lens 3 (44) | 94.9794 | −16.1870 | Fused Silica | 32.894 | 0.00000 |
| 10 | | 64.6474 | −10.9678 | | 37.608 | 0.00000 |
| 11 | | Infinity | −12.0377 | | 0.000 | 0.00000 |
| 12 | | Infinity | −471.9319 | | 0.000 | 0.00000 |
| 13 | Secondary (34) | 1035.6149 | 5564.8210 | Mirror | 200.000 | −0.61611 |
| 14 | | Infinity | 210.9982 | | 119.986 | 0.00000 |
| 15 | Lens (36) | −2685.6131 | 39.0018 | Fused Silica | 117.005 | 0.00000 |
| 16 | | −1233.8027 | 750.0000 | | 117.117 | 0.00000 |
| 17 | Focal Plane | Infinity | 0.0000 | | 79.538 | 0.00000 |

Figure 6:
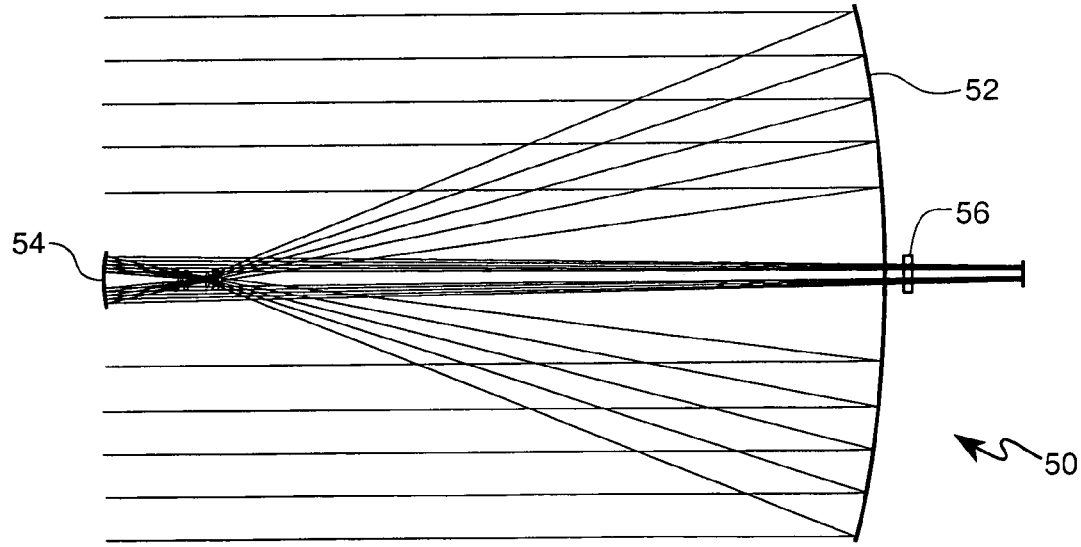
FIG. 6 is a simplified sectional view of another alternative embodiment of the invention.
Figure 7:
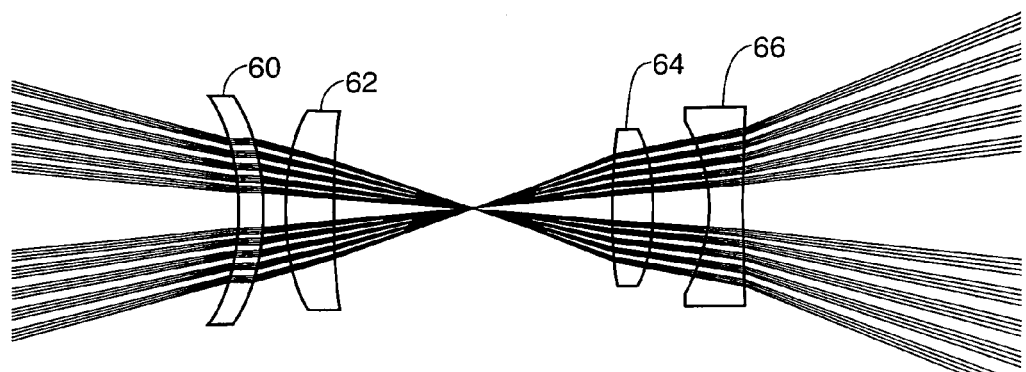
FIG. 7 is an enlarged view of the inter-focal region of FIG. 6.
Figure 8A:
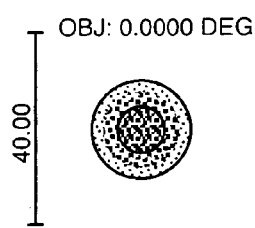
FIG. 8 is a ray-traced spot diagram of the embodiment shown in FIG. 6.
Figure 8B:
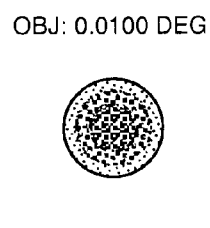
Figure 8C:
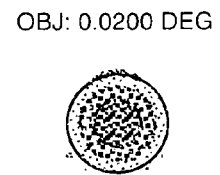
Figure 8D:
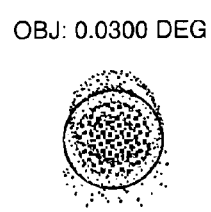
Figure 8E:
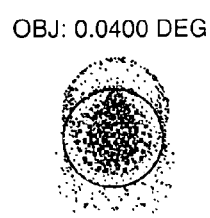
Figure 8F:
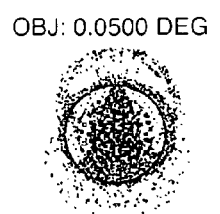

The layout for another embodiment of a four-meter telescope 50 is shown at FIG. 6. This embodiment includes a parabolic primary mirror 52, a spherical secondary mirror 54, and a field flattening lens 56. This embodiment, as shown in FIG. 7, utilizes four inter-focal lenses 60, 62, 64, and 66. This embodiment may be used to produce diffraction limited images over a $\frac{1}{6}^{th}$ degree circular field of view. In this The optical prescription for this embodiment is presented in the table below. The nomenclature used is from the ZEMAX® commercial optical design package. All dimensions are in millimeters (mm). In this embodiment, as shown in the table, fused silica was used for the lenses. However, any material or materials having the desired optical properties may be used.

TABLE 2

Optical Prescription for Telescope 50.

| No. | Comment | Radius of Curvature | Thickness | Glass | Semi Diameter | Conic |
|---|---|---|---|---|---|---|
| 0 | | Infinity | 0.0000 | | 0.000 | 0.00000 |
| 1 | | Infinity | 10.0000 | | 0.000 | 0.00000 |
| 2 | | Infinity | 5724.3994 | | 0.000 | 0.00000 |
| 3 | Primary (52) | −10000.0000 | −4916.4575 | Mirror | 2000.175 | −1.00000 |
| 4 | Lens 1 (60) | 910.3374 | −16.6664 | Fused Silica | 50.000 | 0.00000 |
| 5 | | −87.2203 | −27.1209 | | 43.814 | 0.00000 |
| 6 | Lens 2 (62) | −103.9242 | −19.7158 | Fused Silica | 39.415 | 0.00000 |
| 7 | | 338.5031 | −53.3428 | | 36.299 | 0.00000 |
| 8 | | Infinity | −84.0260 | | 0.000 | 0.00000 |
| 9 | Lens 3 (64) | 457.3144 | −22.6180 | Fused Silica | 45.235 | 29.08592 |
| 10 | | 125.1166 | −10.9678 | | 50.000 | 0.00000 |
| 11 | Lens 4 (66) | −116.7997 | −12.0377 | Fused Silica | 56.658 | 0.00000 |
| 12 | | −116.4897 | −561.4465 | | 56.905 | 0.00000 |
| 13 | Secondary (54) | 1304.2073 | 5724.3994 | Mirror | 200.000 | 0.00000 |
| 14 | | Infinity | 100.0139 | | 101.117 | 0.00000 |
| 15 | Lens (56) | 948.0596 | 66.2366 | Fused Silica | 99.355 | 0.00000 |
| 16 | | 2925.1418 | 833.7495 | | 96.713 | 0.00000 |
| 17 | Focal Plane | Infinity | 0.0000 | | 47.259 | 0.00000 |

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

That which is claimed is:

1. A modified Gregorian telescope, comprising:
   a primary mirror having an aspheric surface for reflecting incoming electromagnetic radiation;
   a secondary mirror, positioned along the same axis as said primary mirror to receive the electromagnetic radiation reflected by said primary mirror, having a spherical surface for further reflecting the electromagnetic radiation to a focal plane; and
   at least three inter-focal lenses positioned within the inter-focal region.

2. The telescope of claim 1, wherein at least one of said plurality of inter-focal lenses has an aspheric surface.

* * * * *